US008409659B2

(12) United States Patent
Sun et al.

(10) Patent No.: US 8,409,659 B2
(45) Date of Patent: Apr. 2, 2013

(54) NANOWIRE SUPPORTED CATALYSTS FOR FUEL CELL ELECTRODES

(75) Inventors: Xueliang Sun, London (CA); Madhu S. Saha, London (CA); Ruying Li, London (CA); Mei Cai, Bloomfield Hills, MI (US)

(73) Assignees: GM Global Technology Operations LLC, Detroit, MI (US); The University of Western Ontario, London, Ontario (CA)

( * ) Notice: Subject to any disclaimer, the term of this patent is extended or adjusted under 35 U.S.C. 154(b) by 1190 days.

(21) Appl. No.: 11/938,843

(22) Filed: Nov. 13, 2007

(65) Prior Publication Data

US 2009/0004552 A1    Jan. 1, 2009

Related U.S. Application Data

(60) Provisional application No. 60/868,216, filed on Dec. 1, 2006.

(51) Int. Cl.
*B05D 5/12* (2006.01)
*C23C 16/00* (2006.01)
*H01M 4/36* (2006.01)
*H01M 8/00* (2006.01)
*H01M 4/88* (2006.01)

(52) U.S. Cl. ............... 427/115; 427/248.1; 427/457; 429/532; 429/535; 502/101

(58) Field of Classification Search ............... None
See application file for complete search history.

(56) References Cited

U.S. PATENT DOCUMENTS

| | | | |
|---|---|---|---|
| 6,586,095 B2 | 7/2003 | Wang et al. |
| 6,683,783 B1 | 1/2004 | Smalley et al. |
| 6,936,994 B1 | 8/2005 | Gimlan |
| 6,940,086 B2 | 9/2005 | Gole et al. |
| 6,996,147 B2 | 2/2006 | Majumdar et al. |
| 7,019,391 B2 | 3/2006 | Tran |
| 7,056,455 B2 | 6/2006 | Matyjaszewski et al. |
| 7,122,106 B2 | 10/2006 | Lin et al. |
| 7,179,561 B2 | 2/2007 | Niu et al. |
| 2006/0188774 A1 | 8/2006 | Niu et al. |

FOREIGN PATENT DOCUMENTS

| | | |
|---|---|---|
| CN | 1472135 A | 2/2004 |
| CN | 1667856 A | 9/2005 |
| CN | 1806966 A | 7/2006 |

OTHER PUBLICATIONS

International Search Report for PCT/2007/085683 dated May 22, 2008.

*Primary Examiner* — Milton I Cano
*Assistant Examiner* — Sarah A Slifka
(74) *Attorney, Agent, or Firm* — BrooksGroup (57) ABSTRACT

Metal oxide nanowires and carbon-coated metal nanowires are effective as supports for particles of an expensive catalyst material, such as platinum metal group catalyst. Such supported catalysts are useful when included in an electrode on, for example, a proton exchange membrane in a hydrogen/oxygen fuel cell. For example, tin oxide nanowires are formed on carbon fibers of carbon paper and platinum nanoparticles are deposited on the tin oxide nanowires. The nanowires provide good surfaces for effective utilization of the platinum material.

9 Claims, 10 Drawing Sheets

NANOWIRE SUPPORTED CATALYSTS FOR FUEL CELL ELECTRODES

This application claims priority based on provisional application 60/868,126, titled "Nano wire Supported Catalysts for PEM Electrodes," filed Dec. 1, 2006, and which is incorporated herein by reference.

TECHNICAL FIELD

This disclosure pertains to catalyst support materials for fuel cell electrodes. More specifically, this disclosure pertains to the use of certain metal oxide nanowires and metal nanowires coated with carbon as supports for catalysts such as platinum nanoparticles.

BACKGROUND OF THE INVENTION

Fuel cells are electrochemical devices that are being developed for motive and stationary electric power generation. Typically each fuel cell comprises a stack of many individual electrochemical cells of like construction, in electrical connection, to provide the power requirements of the device.

One illustrative fuel cell design uses a solid polymer electrolyte (SPE) membrane, or proton exchange membrane (PEM), to provide ion transport between the anode and cathode in each electrochemical cell of a multi-cell fuel cell construction. Currently, state of the art PEM fuel cells utilize a membrane made of one or more perfluorinated ionomers such as DuPont's Nafion®. The ionomer carries pendant ionizable groups (e.g. sulfonate groups) for transport of protons through the membrane from the anode to the cathode. Gaseous and liquid fuels capable of providing protons are used. Examples include hydrogen and methanol, with hydrogen being favored. Hydrogen is supplied to each electrochemical cell anode. Oxygen (as air) is the cell oxidant and is supplied to each cell's cathode. The electrodes are formed of porous conductive materials, such as woven graphite, graphitized sheets, or carbon paper to enable the fuel to disperse over the surface of the membrane facing the fuel supply electrode. Each electrode has finely divided catalyst particles (for example, platinum particles), supported on carbon paper, to promote ionization of hydrogen at the anode and reduction of oxygen at the cathode. Protons flow from the anode through the ionically conductive polymer membrane to the cathode where they combine with oxygen to form water, which is discharged from the cell. Conductor plates carry away the electrons formed at the anode.

Electrocatalysts promote the reactions between hydrogen and oxygen to generate electricity for low temperature (for example, 80° C.) fuel cells like PEM fuel cells. Platinum is presently a preferred choice as a catalyst for the electroreduction of oxygen in acidic media. The electrocatalytic activity of Pt catalyst is dependent on many factors including the properties of the support material on which the nanosize platinum particles are carried. Suitable catalyst support particles need to provide high surface area for effective dispersion of catalyst particles and suitable electronic conductivity for efficient electrode function. Carbon black (Vulcan XC-72R) has been a widely used support for preparing fuel cell catalysts because it has provided a combination of electronic conductivity and reasonable surface area. However, the inventors herein note that many platinum nanoparticles are trapped in deep cracks within the carbon black. The trapped catalyst particles are blocked from effectively presenting necessary three-phase boundary reactive sites in the electrode, and utilization of the expensive platinum material is significantly reduced. Therefore, it is necessary to identify and prepare different catalyst support materials with surface characteristics that make better utilization of expensive electrocatalyst materials.

SUMMARY OF THE INVENTION

A new catalyst support material is provided for more effectively carrying and dispersing particles of an expensive catalyst material. The support material was developed for carrying nanosize particles of platinum for use, for example, as part of the electrode structure on a conductive membrane for a fuel cell. But the support material may have utility in other catalyst applications.

Metal oxide nanowires are provided as one group of support structures. Nanowires have very small diameters in the range of 1-100 nm with lengths of micrometer scale. In this group of nanowire supports, tin oxide, titanium oxide, tungsten nanowires are preferred. Metal nanowires with overlying carbon nanotube shells are a second group of support structures. Of this group of core/shell structures, tin nanowire cores with carbon nanotube shells have been found to be particularly useful. These nanowire structures provide ample surface area for deposition of platinum catalyst particles (for example) and the nature of the nanowire surfaces is such that the catalyst particles are effectively exposed to a fluid medium to be catalyzed. The nanowires may be formed and deposited directly on carbon fibers (for example, carbon fibers in a carbon cloth) for use in fuel cell electrodes.

In one method embodiment of the invention, metal oxide nanowires are formed by providing a commercially pure powder of the metal and forming the metal oxide on or near the powder by heating the powder in a flowing inert atmosphere containing a minimal amount of oxygen. The reaction is suitably conducted in a heated flow-through furnace maintained at, for example, about 800° C. to about 900° C. Argon is a suitable inert atmosphere constituent when it contains impurity or leakage amounts of oxygen (for example, up to about one hundred parts per million of oxygen in a supply of argon). In this way $SnO_2$, $TiO_2$ or $WO_3$ nanowires, for example, are formed. The forming nanowires are carried just downstream in the inert gas flow and may be deposited as they are formed on carbon fibers or other suitable substrate or container.

In another embodiment of the invention, the inert gas atmosphere is modified to contain a suitable amount of a carbon-containing gas such as the hydrocarbon, ethylene (rather than oxygen). At the high temperature of the flow-through reactor, and in this less oxidizing atmosphere, unique core-shell nanowire structures are formed. The nanowires have a core of tin, for example, with a carbon nanotube shell. These particles are also carried in the flowing gas and immediately deposited on carbon fibers or the like.

Both the metal oxide nanowires and the carbon-coated metal nanowires provide catalyst support surfaces that are useful in fuel cell applications. When the supported catalysts are to be used in fuel cell membrane electrodes it is preferred to form the nanowire catalyst support structures on a fuel cell backing material such as carbon paper. This combination provides good electrical conduction and connectivity in the electrode. The catalyst metal is then deposited on the nanowires and the supported catalyst and carbon fiber combination is ready for placement in the electrode structure (cathode and/or anode) on the solid polymer electrolyte membrane or other membrane material.

Other objects and advantages of the invention will be apparent from a description of the preferred embodiments which follows.

BRIEF DESCRIPTION OF THE DRAWINGS

FIG. 10 presents four cyclic voltammetry curves for platinum on $SnO_2$ nanowires catalyst prepared in accordance with the invention. The catalysts were prepared by an electrochemical method and tested in oxygen saturated phosphate buffer solution (pH=7.4) at room temperature. Traces A and B are after and before deposition of the Pt nanoparticles. Traces C and D are the blank response at $SnO_2$ nanowires before and after Pt nanoparticles, respectively, in deoxygenated phosphate buffer solution. The data is presented as current density (mAcm$^{-2}$) versus potential (V vs. Ag/AgCl).

DESCRIPTION OF PREFERRED EMBODIMENTS

In the preparation of catalysts for automotive exhaust treatment and for operation of fuel cells, metal catalyst particles are usually deposited on a support in the form of a powder of suitable composition. The support powder is usually in the form of very small, generally spherical particles with surface features that provide a large surface area for effective dispersion of expensive catalyst particles over the surface of each support particle. The goal is to place each expensive catalyst particle on the support material so that the particle can interact with the fluid medium (typically a gas) to be catalyzed. For example platinum particles of nanometer size are deposited on carbon black support particles for fuel cell electrodes and platinum group metals are deposited on alumina powder for exhaust emission control.

In the case of catalysts for fuel cell electrodes it is now realized that only a fraction of the platinum particles deposited on carbon black are electrically connected to the backing electrode under fuel cell conditions. To increase full utilization of Pt-based catalysts, controlling the microstructure of the electrode with three-dimensional structure, such as the catalyst support, will be essential in addressing this issue. The present invention will be specifically described below based on different kinds of metal oxide nanowires and carbon-coated metal oxide nanowires as a support for the Pt nanoparticles catalysts in the examples. But the present invention is not solely limited to these examples.

This invention is based on the use of certain materials in the form of nanowires as catalyst supports to make more effective use of catalysts such as the platinum group metals in applications such as electrodes for fuel cells.

Nanowires have been formed of a variety of inorganic materials including elemental semiconductors (Si, Ge, and B), Groups III-V semiconductors (GaN, GaAs, GaP, InP, InAs), Groups II-VI semiconductors (ZnS, ZnSe, CdS, CdSe), and metal oxides (ZnO, MgO, $SiO_2$, $Al_2O_3$, $SnO_2$, $WO_3$, $TiO_2$). Using metal oxide nanowires as supports for noble metal nanoparticles, such as Pt (Pt used as an example), have unique advantages for practical applications. First, certain metal oxides, such as $SnO_2$, $WO_3$ and $TiO_2$, have exhibited useful catalytic properties on their own. Using such materials as supports for a noble metal catalyst like Pt may enhance the overall catalytic activities of the combination. Second, there is a strong interaction between Pt nanoparticles and metal oxide surfaces which can contribute to the catalytic activity of the support-catalyst combination. Third, higher gas permeability is expected with the 3D structure resulting from a network of nanowires. Finally, dopants of various elements may be introduced into nanowire compositions to improve desired properties of these support materials such as their electrical conductivity. Thus, the inventors herein believe that nanowire-based catalyst structures will take full advantage of a combination of several factors including effective utilization of noble metal nanoparticles, enhanced catalyst support effect of Pt-MOx, and improved mass transport in the 3D structures for various applications.

Nanowires have been synthesized using vapor phase or solution processing techniques. Compared to physical methods such as nano-lithography and other patterning techniques, chemical methods are seen to be more versatile and effective in the synthesis of these nanowires. The chemical synthesis includes various methods: thermal evaporation, chemical vapor-phase deposition, metal-organic chemical vapor-phase deposition, arc-discharge, laser ablation, sol-gel, and template-based methods. Of these methods, thermal evaporation provides a simple procedure capable of being scaled for different amounts of product. Thermal evaporation processes can produce nanowires with or without dopants, and can produce free standing nanowires or produce them on a substrate.

In order to develop nanowire-based composite electrodes for fuel cells, two significant fabrication processes should be available. They include: (i) synthesis of nanowires directly on fuel cell backings such as carbon paper or as free-standing on precursor metal powder and (ii) deposition of platinum nanoparticles with controlled size and dispersion on the nanowires. The following descriptions are provided for making nanowires and for depositing platinum nanoparticles on them.

Experimental Practices

Synthesis of Metal Oxide and Carbon-coated Metal Nanowires

1. Synthesis

Figure 1:
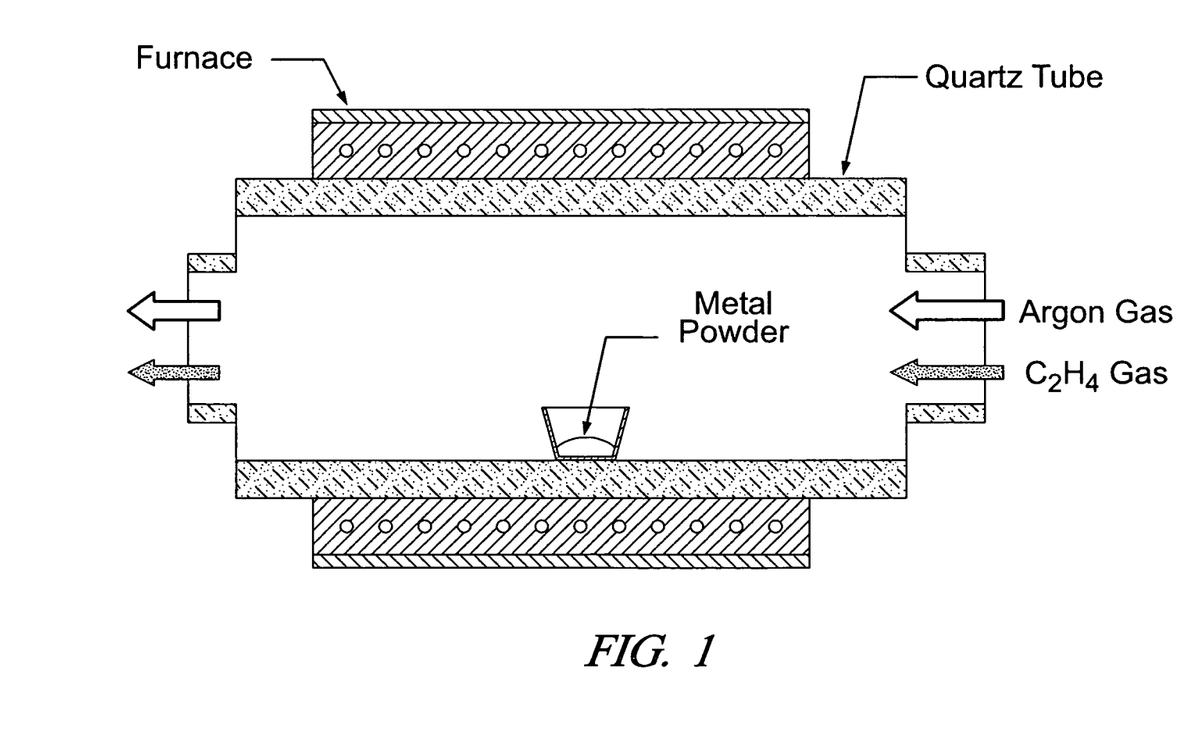
FIG. 1 is a schematic diagram of a horizontal tubular furnace with inserted quartz tube for the synthesis of metal oxide nanowires under flowing oxygen-containing argon from precursor metal powder contained in an alumina boat. Ethylene gas was used when carbon-coated metal nanowires were synthesized.

Metal oxide nanowires were synthesized by a thermal evaporation method. A schematic diagram of synthesis apparatus and gas flow is shown in FIG. 1. An alumina boat loaded with pure commercial tin (Sn) powders (in the case of $SnO_2$ nanowires or carbon-coated Sn nanowires) was placed in the middle of a quartz tube and inserted into a horizontal tube furnace. In experiments in which nanowires were grown on a carbon paper substrate, a small piece of carbon paper (not illustrated in FIG. 1) was placed in the alumina boat beside the metal powder. The reaction chamber was heated to a temperature in the range of 800° to 900° C. rapidly (about 15 min) from room temperature under a flowing Ar atmosphere. A grade of argon gas was used that contained sufficient oxygen (a few hundred parts-per-million) to oxidize the tin powder to $SnO_2$ nanowires. In the case of carbon-coated Sn nanowires, ethylene gas ($C_2H_4$) was flowed in the argon to improve electrical conductivities and corrosion resistance. Metallic tin core-amorphous carbon nanotube shell nanowires were synthesized. Subsequent to each metal oxide or carbon-coated metal nanowires synthesis run, the furnace was kept at temperature for about 2 hours, and then cooled down to room temperature under Ar gas.

Figure 2A:
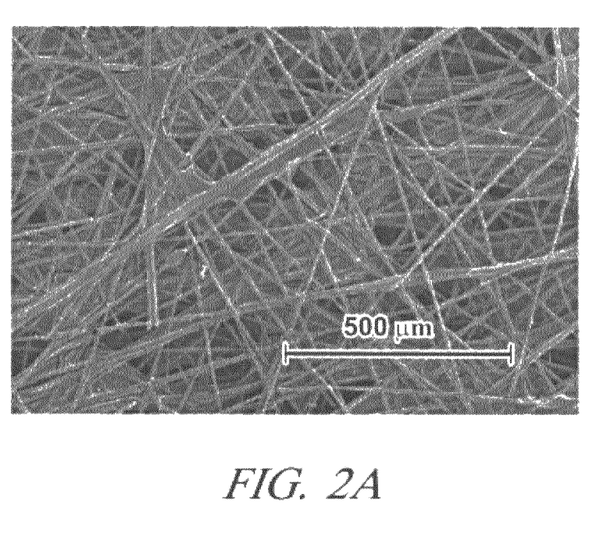
FIG. 2A is a scanning electron micrograph (SEM) of carbon paper used in some experiments of the deposit of metal oxide nanowires.
Figure 2B:
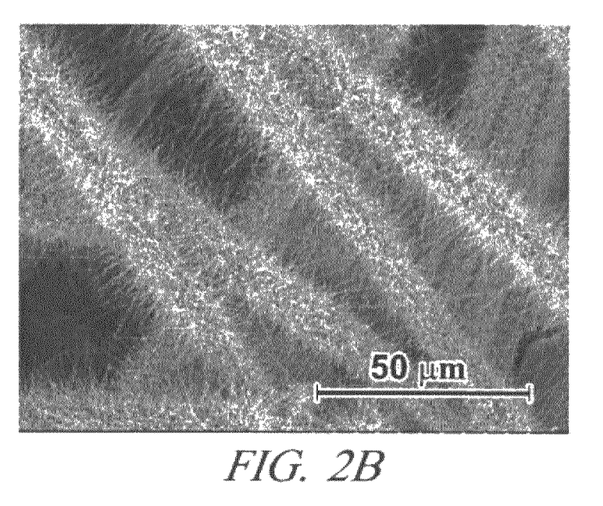
FIG. 2B is a SEM micrograph of $SnO_2$ nanowires grown on carbon fibers of a carbon paper by a thermal evaporation method.

The synthesized samples were examined by scanning electron microscopy (SEM) and transmission electron microscopy (TEM). FIG. 2A shows the SEM micrographs of bare carbon paper with higher magnification. FIG. 2B shows the SEM micrograph of $SnO_2$ nanowires grown on carbon fibers of a carbon paper. As shown in FIG. 2B, a thin layer and high-density of nanowires covers the carbon paper.

2. Oxidative Pretreatment of Nanowires

The produced nanowires do not possess a high number of surface functional groups. Therefore, an oxidative pretreatment of the nanowires is preferred in most cases in order to enhance interactions between surfaces of the metal oxide nanowires and particles of catalyst metal to be deposited on surfaces of the nanowires. It is found that such oxidation of the metal oxide surfaces leads to a more uniform distribution of metal nanoparticle catalysts on nanowires. $HNO_3$ or mixtures of $HNO_3$-$H_2SO_4$ are examples of suitable oxidants for treatment of the metal oxide nanowires. The nanowires, either directly grown on carbon paper (e.g. $SnO_2$ and $TiO_2$) or freestanding as a form of powder (e.g. $Al_2O_3$ and WOx), were oxidized chemically in 5.0 M nitric acid aqueous solution for 10 hours. Afterwards, oxidized nanowires were washed thoroughly with deionized water until the pH of the rinsing water became neutral, and then dried under vacuum at 90° C. for 5 hours.

3. Deposition of Pt Nanoparticles on $SnO_2$ Nanowires by an Electrochemical Method Electrochemistry is a powerful technique for the deposition of many metals, being both rapid and facile to easily control the nucleation and growth of metal nanoparticles. Electrochemical measurements were performed using an Autolab potentiostat/galvanostat in a three-electrode, two-compartment configuration including a working electrode, a coiled platinum auxiliary electrode, and an Ag/AgCl (3M KCl) reference electrode. Electrochemical deposition of Pt nanoparticles on surfaces of $SnO_2$ nanowires was performed as a three-step process.

In the first step, the $SnO_2$ nanowires were oxidized in 5.0 M nitric acid aqueous solution for 10 hours as described above. Then to increase the electrochemical activity of the surface of the nanowires in water solution, the $SnO_2$ nanowire electrode (arranged as an anode in an electrolytic cell) was cycled in the potential range of −0.15V to +1.3 V vs. Ag/AgCl with a sweep rate of $50 mVs^{-1}$ in 0.1 M $H_2SO_4$ aqueous electrolyte solution by cyclic voltammetry until steady curves were obtained. This surface activation step produces oxide functional groups such as hydroxyl (—OH), carboxyl (—COOH) and carbonyl (—C=O) at the defect sites located at the ends and/or the sidewalls of the nanowires.

In the second step, octahedral complexes of Pt(IV) were formed on the functionalized nanowires. The nanowires were arranged as the cathode in an electrolytic cell and platinum complexes from 3 mM $K_2PtCl_4$ in 0.1 M $K_2SO_4$ aqueous solutions were deposited on the nanowires by cyclic voltammetry under conditions of a potential range from +0.34 to +1.34 V at a scan rate of 5 mVs$^{-1}$.

In the third step, the surface complexes on the nanowires were converted to Pt nanoparticles through cycling from +1.64 to −0.21 V in 0.1 M $H_2SO_4$ solution.

Figure 3A:
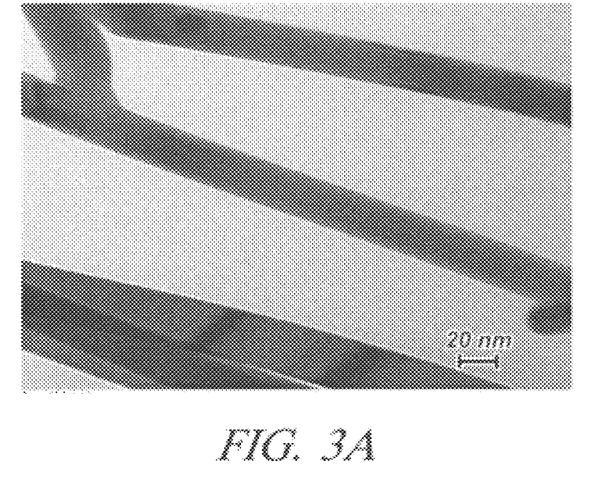
FIG. 3A is a transmission electron microscope (TEM) image of $SnO_2$ nanowires grown on carbon fibers of a carbon paper by a thermal evaporation method.
Figure 3B:
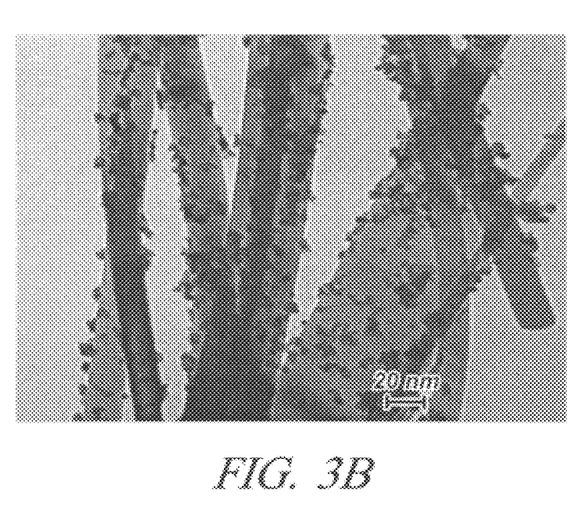
FIG. 3B is a TEM image of Pt nanoparticles electrodeposited on $SnO_2$ nanowires grown on carbon fibers of a carbon paper.

FIG. 3A shows the TEM image of $SnO_2$ nanowires grown on carbon fibers of a carbon paper by thermal evaporation method. FIG. 3B shows the TEM image of Pt nanoparticles electrodeposited on $SnO_2$ nanowires. Pt nanoparticles with a size of 4 to 7 nm can be observed clearly on the surface of $SnO_2$ nanowires with relative uniformity.

4. Deposition of Pt Nanoparticles on Carbon-Coated Sn Nanowires by an Electrochemical Method In order to improve electrical conductivities and corrosion resistance, carbon-coated Sn nanowires were synthesized through introduction of ethylene gas during the growth of nanowires. The resultant nanostructure consists of a core/shell structure, which has metallic Sn nanowires as a core and amorphous carbon nanotubes as a shell. This structure is referred to in this specification as "carbon-coated Sn nanowires" or, more generally, carbon-coated metal nanowires.

Figure 4A:
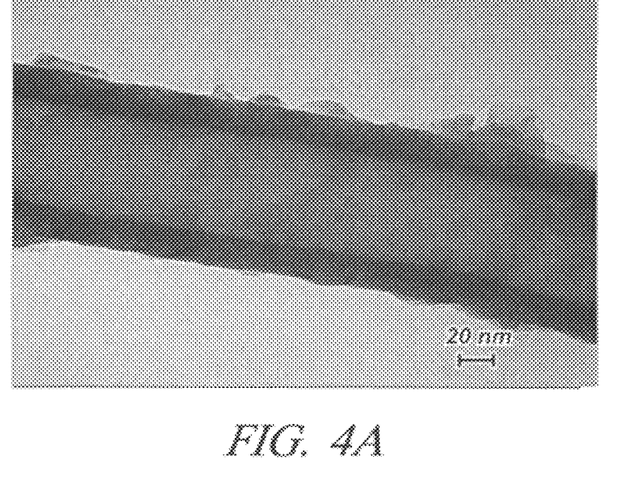
FIG. 4A is a TEM image of carbon-coated tin nanowires grown on carbon fibers of a carbon paper.
Figure 4B:
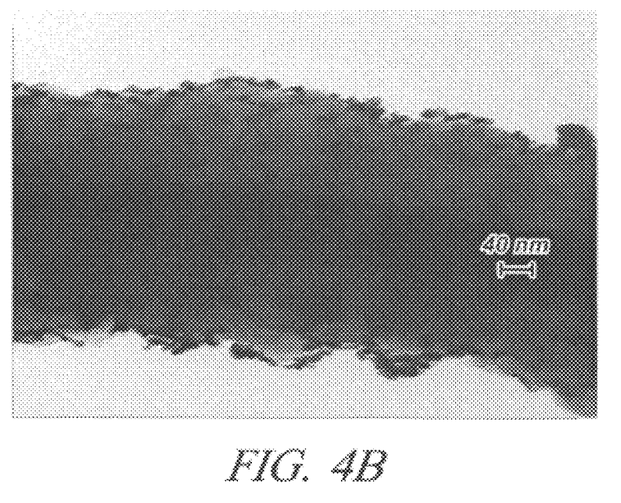
FIG. 4B is a TEM image of Pt nanoparticles electrodeposited on carbon-coated tin nanowires grown on carbon fibers of a carbon paper.

Nanometer size platinum catalyst particles were deposited on carbon-coated Sn nanowire supports by electrochemical deposition steps like those described above for preparing Pt nanoparticles supported $SnO_2$ nanowire catalysts. FIG. 4A is a TEM image of carbon-coated Sn nanowires grown on carbon fibers of a carbon paper by the described thermal evaporation method. FIG. 4B is TEM image of carbon-coated Sn nanowires after deposition of the Pt nanoparticles by electrochemical deposition method. Pt nanoparticles with a size of 4 to 7 nm can be observed clearly on the surface of carbon-coated Sn nanowires.

5. Deposition of Pt Nanoparticles on $SnO_2$ Nanowires by a Chemical Method

Platinum nanoparticles were deposited on the $SnO_2$ nanowires using the well-known impregnation method followed by reduction with borohydride. $SnO_2$ nanowires were immersed in an aqueous solution of 10 mM $H_2PtCl_6$. After magnetic stirring for about 12 hours, the platinum salt was reduced by slowly adding a solution that was a mixture of 0.1M $NaBH_4$ and 1M NaOH. When the reaction was complete, the resultant suspension of platinum nanoparticles supported on $SnO_2$ nanowires catalysts was filtered, washed and vacuum-dried at 90° C. for 4 hours.

SPECIFIC EXAMPLES

Example 1

$SnO_2$ Nanowires-Carbon Paper Composite as an Electrode

This example demonstrates that nanowires may be grown directly on carbon paper and that platinum particles (for example) may then be deposited selectively on the nanowires to improve platinum utilization by securing the electronic route from platinum particle to the supporting electrode in, for example, PEM fuel cells. The deposition of platinum on $SnO_2$ nanowires is described above. But it is of practical importance to demonstrate that the nanowires-carbon paper composite is really an electrode, i.e., the nanowires are in electrical contact with the carbon fibers of the carbon paper.

Figure 5:
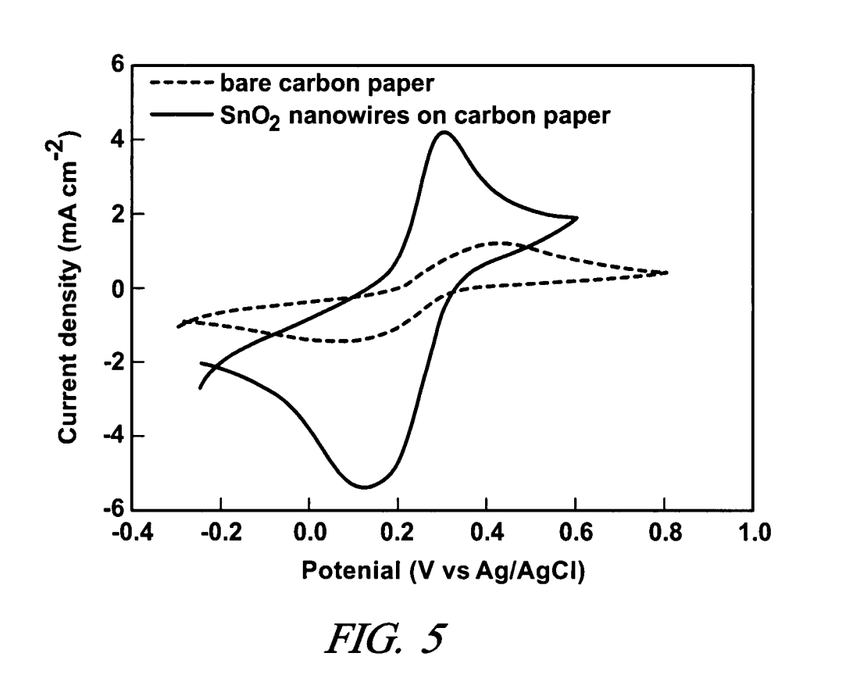
FIG. 5 presents the voltammetry cycling data of the Fe $(CN)_6^{3-/4-}$ couple on a bare carbon paper (dotted data lines) and on $SnO_2$ nanowires grown on the carbon paper (solid data lines). Current density (mA $cm^{-2}$) is plotted versus potential (V vs. Ag/AgCl).

The electrical contact between $SnO_2$ nanowires and the carbon fibers of the carbon paper were characterized by cyclic voltammetry in 5 mM $K_3Fe(CN)_6$ aqueous solution in 0.5 M $K_2SO_4$ in a standard three-electrode electrochemical cell. The working electrode was carbon paper or $SnO_2$ nanowires electrode. A Ag/AgCl (3M KCl) electrode and a coiled platinum wire were used as the reference and the auxiliary electrode, respectively. The cyclic voltammetry plots for bare carbon paper and $SnO_2$ nanowires grown on the carbon paper are shown in FIG. 5. The oxidation of potassium ferrocyanide has served as a benchmark in investigation electrochemistry at different carbon electrodes. The electrochemical oxidation generates ferrocyanide, and the redox couple $Fe(CN)_6^{4-}/Fe(CN)_6^{3-}$ is close to an ideal system with quasi-reversibility. A typical voltammogram with graphite features, and a much higher redox current obtained for the $SnO_2$ nanowires-carbon paper composite, strongly indicates that $SnO_2$ nanowires are electrically connected to the carbon paper substrate. This is an important behavior as a composite electrode.

Example 2

Characterization of Deposited Pt Nanoparticles by Cyclic Voltammetry

Figure 6A:
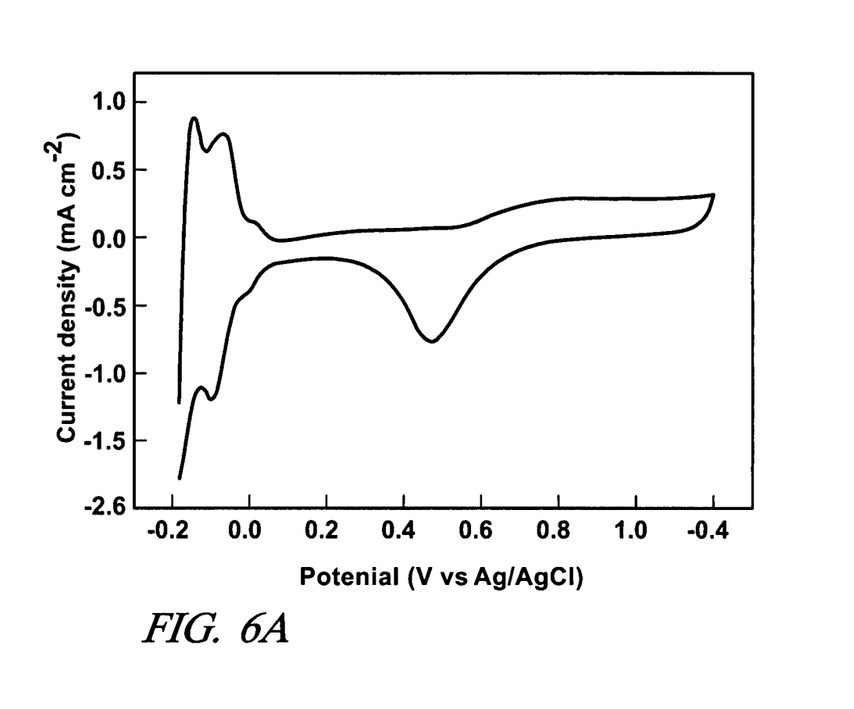
FIG. 6A presents cyclic voltammogram data illustrating the electrocatalytic nature of Pt nanoparticles electrodeposited on $SnO_2$ nanowires in Ar-saturated 0.5 M $H_2SO_4$ aqueous solution at room temperature. Current density (mA $cm^{-2}$) is plotted versus potential (V vs. Ag/AgCl). The potential scan rate was 50 mV $s^{-1}$.

1. Pt Nanoparticles Supported $SnO_2$ Nanowire Catalysts Prepared by an Electrochemical Method:

Cyclic voltammogram data illustrating electrocatalytic nature of Pt nanoparticles electrodeposited on $SnO_2$ nanowires in Ar-saturated 0.5 M $H_2SO_4$ aqueous solution at room temperature are presented FIG. 6A. The cyclic voltammetric behavior is reproducible and represents absorption and desorption of hydrogen. A reduction peak centered at 0.5 V can be observed during the negative-going potential sweep (FIG. 6A). This reduction peak can be attributed to the reduction of platinum oxide. This feature of the curve is consistent with those of the cyclic voltammogram curves for Pt electrodes. Thus, it may also be concluded that the platinum nanoparticles have a very clean active surface. This result demonstrates that the Pt nanoparticles thus deposited show higher utilization and are in electrical contact with the underlying $SnO_2$ nanowires.

From the integration of the desorption peaks after excluding the double layer charging effect, the total charges of hydrogen desorption on the Pt nanoparticles electrodeposited $SnO_2$ nanowires electrode is calculated at 7.8 mC/cm$^2$. Accordingly, assuming a charge of 210 mC/cm$^2$ for the monolayer adsorption of hydrogen on smooth Pt electrode surface, the electrochemical surface area (roughness factors) for the Pt nanoparticles electrodeposited on $SnO_2$ nanowires electrode is 37.3 cm$^2$/cm$^2$, while that for commercial Pt/C catalyst is 33.7 (see comparative Example 1). This proves that the Pt nanoparticles thus deposited show higher utilization and are in electrical contact with the carbon paper, which is essential in making a good membrane electrode assembly (MEA) for PEM fuel cells.

Figure 6B:
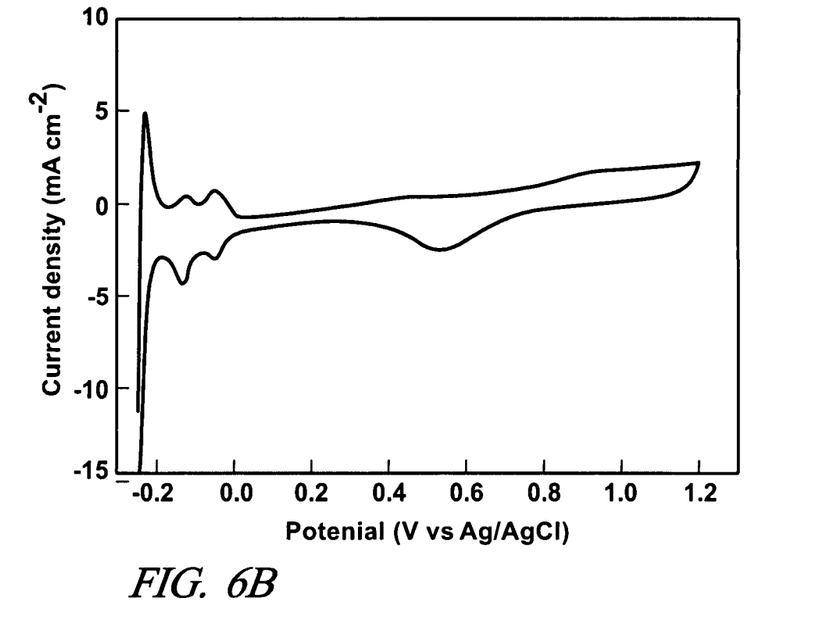
FIG. 6B presents cyclic voltammogram data illustrating the electrocatalytic nature of Pt nanoparticles electrodeposited on carbon-coated Sn nanowires prepared by an electrochemical method. The catalyst particles are tested in Ar-saturated 0.5 M $H_2SO_4$ aqueous solution at room temperature. Current density (mA $cm^{-2}$) is plotted versus potential (V vs. Ag/AgCl). The potential scan rate was 50 $mVs^{-1}$.

2. Pt Nanoparticles Deposited on Carbon-Coated Sn Nanowires Catalysts Prepared by an Electrochemical Method:

Pt nanoparticles supported on carbon-coated Sn nanowires were prepared for evaluation as catalysts by the electrochemical method described above in this specification. In a similar way to that of Pt nanoparticles supported on $SnO_2$ nanowire catalysts, a cyclic voltammogram was carried out. It can be seen in FIG. 6B, the characteristic hydrogen under-potential deposition region, the formation of oxide on the surface of Pt particles and the reduction of the oxide were observed.

Figure 6C:
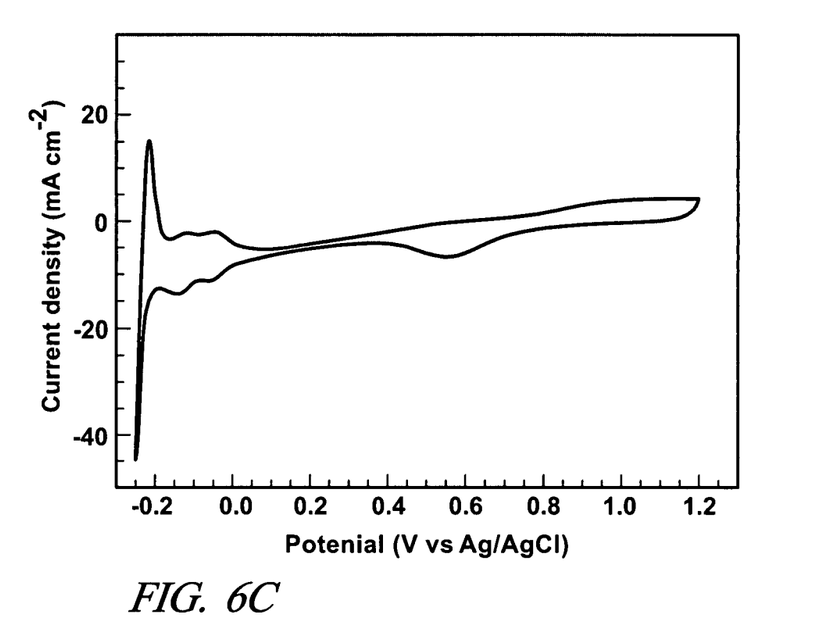
FIG. 6C presents cyclic voltammogram data illustrating the electrocatalytic nature of Pt nanoparticles electrodeposited on carbon-coated Sn nanowires prepared by a chemical method. The catalyst particles are tested in Ar-saturated 0.5 M $H_2SO_4$ aqueous solution at room temperature. Current density (mA $cm^{-2}$) is plotted versus potential (V vs. Ag/AgCl). The potential scan rate was 50 $mVs^{-1}$

3. Pt Nanoparticles Deposited on Carbon-Coated Sn Nanowires Catalysts Prepared by a Chemical Method:

In a similar way to that of Pt nanoparticles supported $SnO_2$ nanowire catalysts, a cyclic voltammogram was carried out for the Pt nanoparticles supported on carbon-coated Sn nanowires catalysts prepared by the chemical method. It can be seen in FIG. 6C, the characteristic hydrogen under-potential deposition region, the formation of oxide on the surface of Pt particles and the reduction of the oxide were observed.

Comparative Example 1

Conventional Pt/C Catalysts

Figure 6D:
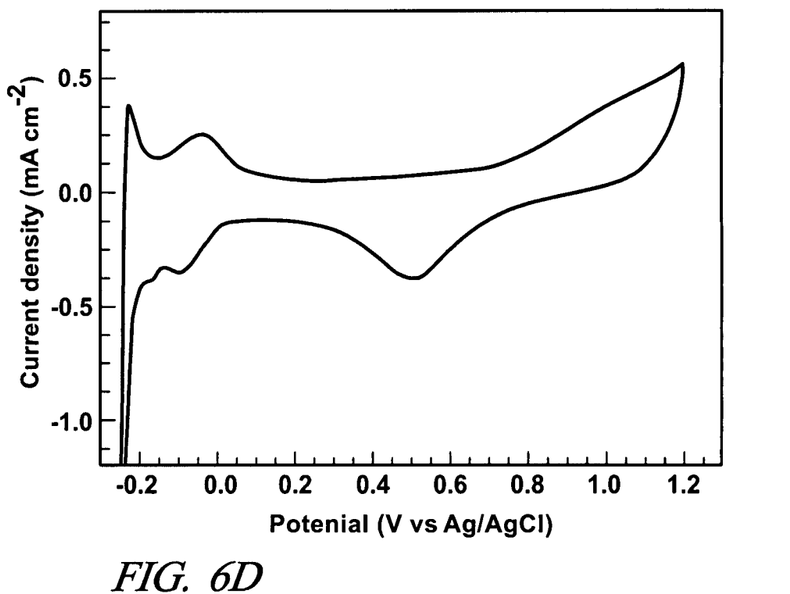
FIG. 6D presents cyclic voltammogram data illustrating the electrocatalytic nature of a commercial Pt on carbon black. The catalyst particles are tested in Ar-saturated 0.5 M $H_2SO_4$ aqueous solution at room temperature. Current density (mA $cm^{-2}$) is plotted versus potential (V vs. Ag/AgCl). The potential scan rate was 50 $mVs^{-1}$.

In order to compare the performance of the composite electrode consisting of Pt nanoparticles supported $SnO_2$ nanowire catalysts, a commercially obtained Pt/C (Pt 30 wt %/Vulcan XC-72 from E-TEK) catalyst was tested. Cyclic voltammogram was carried out as described in Example 2. Five milligrams of the Pt/C catalysts were sonically mixed with 1 mL 5 wt % Nafion solution (Ion Power Inc.) to make a suspension. Five micro liters of this suspension was pipetted onto the surface of a glassy carbon electrode (diameter: 3 mm) and left to dry at room temperature. Pt loadings of the Pt/C electrode were 0.1 mg/cm². FIG. 6D shows the cyclic voltammogram at commercial Pt/C catalysts in Ar-saturated 0.5 M $H_2SO_4$ aqueous solution at room temperature. The total charges of hydrogen desorption and the electrochemical surface areas are calculated at 7.0 mC/cm² and 33.7 cm²/cm², respectively.

Example 3

Electrocatalytic Activity of Oxygen Reduction Reaction in Acidic Solution

Figure 7:
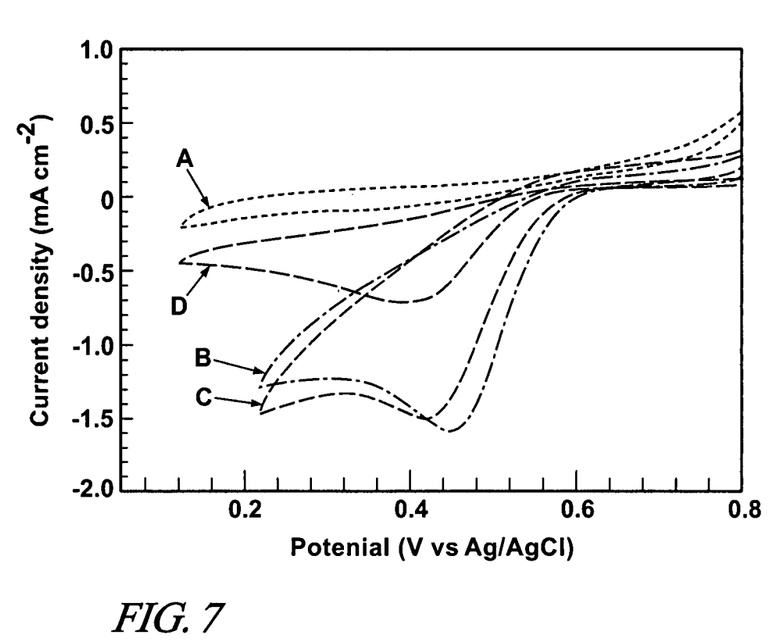
FIG. 7 presents four curves of voltammetry data for a comparison of oxygen reduction reaction currents. Curve A is the voltammetry data for $SnO_2$ nanowires. Curve B is for $SnO_2$ nanowire supported Pt nanoparticles, and Curve C is for carbon-coated Sn nanowire supported Pt nanoparticles, where both catalysts were prepared by the electrochemical method. Curve D is like data for a conventional carbon supported platinum catalyst sold for fuel cell applications. Current density (mAcm$^{-2}$) is plotted versus potential (V vs. Ag/AgCl). The potential scan rate was 50 mVs$^{-1}$.

1. Pt Nanoparticles Supported Nanowire Catalysts Prepared by an Electrochemical Method:

The oxygen reduction reaction is especially important for realizing highly efficient fuel cells, batteries, and many other electrode applications. Pt and Pt-based alloy particles on a variety of carbon supports are the most widely used and efficient catalysts for the fuel cell cathode. For the oxygen reduction experiments with the Pt nanoparticles supported $SnO_2$ nanowire catalysts, a solution of 0.5 M $H_2SO_4$ was purged with ultra-pure oxygen for 30 min. The solution became completely saturated with oxygen. The electrode was scanned over a potential range from 0.8 V to 0.2 V at scan rate of 50 mVs⁻¹. FIG. 7 presents voltammetry data for a comparison of oxygen reduction reaction currents for the $SnO_2$ nanowire (Curve A). Curve B presents voltammetry data for the $SnO_2$ nanowire supported Pt-nanoparticle catalyst and Curve C presents the data for the carbon-coated Sn nanowire supported platinum nanoparticles. Both of these nanowire supported catalysts were prepared by the electrochemical method. In the absence of the Pt nanoparticles, no oxygen reduction is observed over this potential window (0.1 to 0.8 V, curve A). After Pt nanoparticles electrodeposition, a significant positive shift of the oxygen reduction potential and a concurrent increase in the oxygen reduction peak current were observed (Curves B and C). A positive oxygen reduction potential and a high oxygen reduction current are two essential requirements for selective detection of oxygen. In addition, a high oxygen reduction current is paramount for an efficient fuel cell.

Comparative Example 2

2. Electrocatalytic Activity of Oxygen Reduction Reaction at Conventional Pt/C Catalysts:

In order to compare the performance of the composite electrode consisting of Pt nanoparticles supported $SnO_2$ nanowire catalysts, a commercially obtained Pt/C (Pt 30 wt %/Vulcan XC-72 from E-TEK) catalyst was tested and shown in FIG. 7, curve D. Compared with the commercial electro-catalyst, both Pt nanoparticles supported $SnO_2$ nanowire and SnC nanowires catalysts showed enhanced activity for oxygen reduction reaction. It can be seen that a 50 mV and 70 mV shift in the onset potential for oxygen reduction at Pt nanoparticles deposited $SnO_2$ nanowires and carbon-coated Sn nanowires catalysts was observed, respectively. These results show that catalytic Pt nanoparticles supported on metal oxide nanowires or carbon-coated metal nanowires have higher electrocatalytic activity in an oxygen reduction reaction.

Figure 8A:
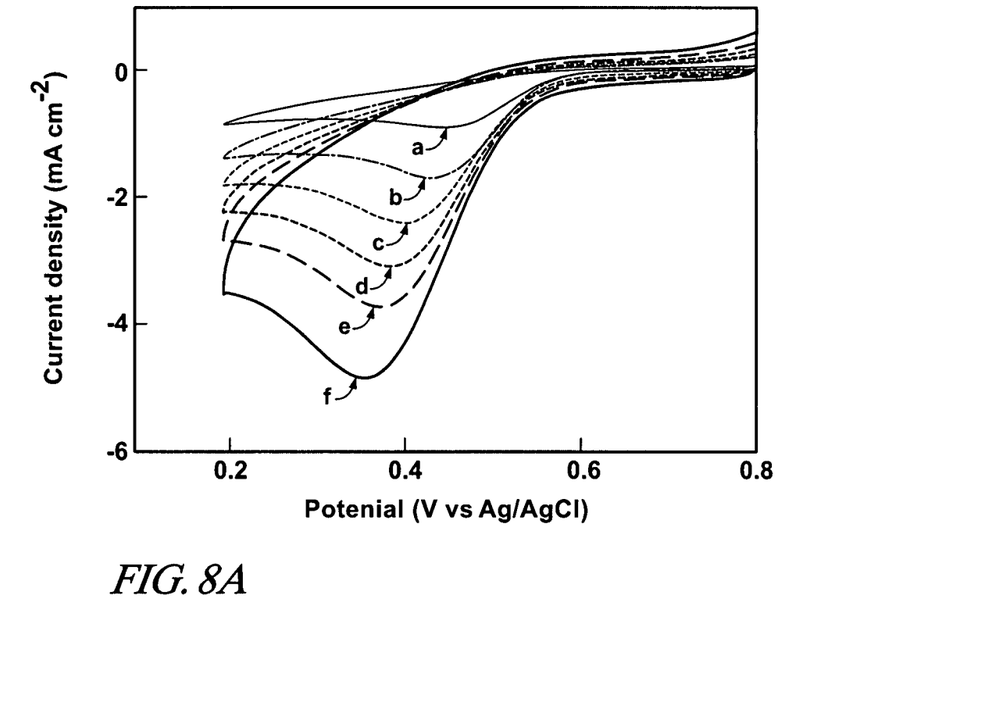
FIG. 8A presents six cyclic voltammetry curves for platinum on carbon-coated Sn nanowires prepared in accordance with this invention. The catalysts were prepared by an electrochemical method and tested in $O_2$-saturated 0.5 M $H_2SO_4$ aqueous solution at room temperature. The scan rates for the six curves were: a) 20, b) 50, c) 100, d) 150, e) 200, and f) 300 mVs$^{-1}$. The data is presented as current density (mAcm$^{-2}$) versus potential (V vs. Ag/AgCl).
Figure 8B:
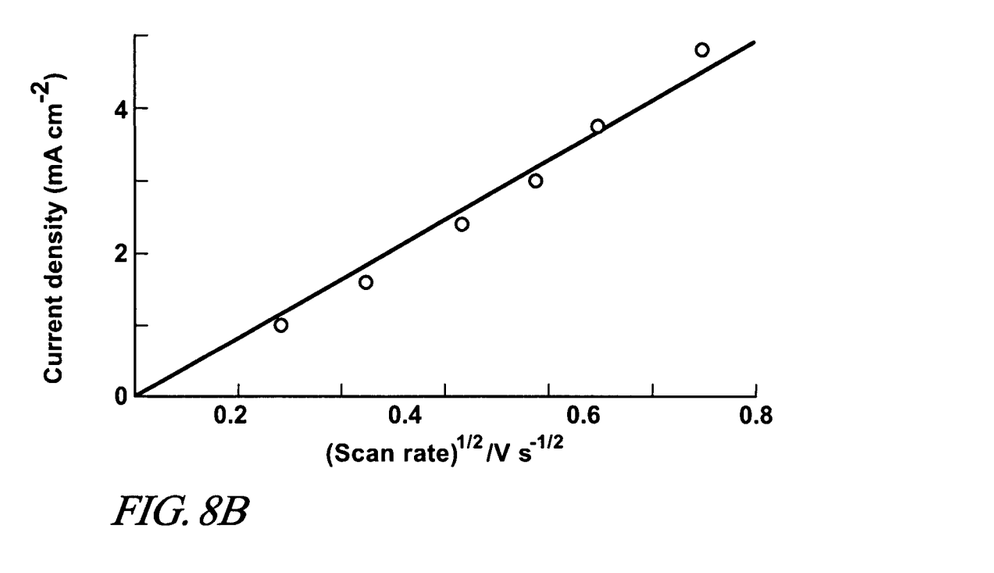
FIG. 8B is a curve of peak current density (mAcm$^{-2}$) versus (scan rate)$^{1/2}$/VS$^{-1/2}$ for the data of FIG. 8A.

3. Oxygen Reduction Reaction is a Diffusion Controlled Process at Pt Electrodeposited Sn Nanowires Catalysts Coated With Carbon:

FIG. 8A shows the cyclic voltammograms for oxygen reduction reaction at the subject catalysts consisting of Pt nanoparticles supported on carbon-coated Sn nanowires when the carbon-coated Sn nanowires were first grown on carbon fibers of carbon paper in oxygen saturated 0.5 M $H_2SO_4$. The six voltammetry curves presented in FIG. 8A were produced at different potential scan rates. The peak current increases linearly with the square root of the scan rates as shown in the FIG. 8B. This fact indicates that the oxygen reduction reaction process on Pt electrodeposited carbon-coated Sn nanowires catalysts is controlled by diffusion of oxygen to the electrode surface.

Figure 9:
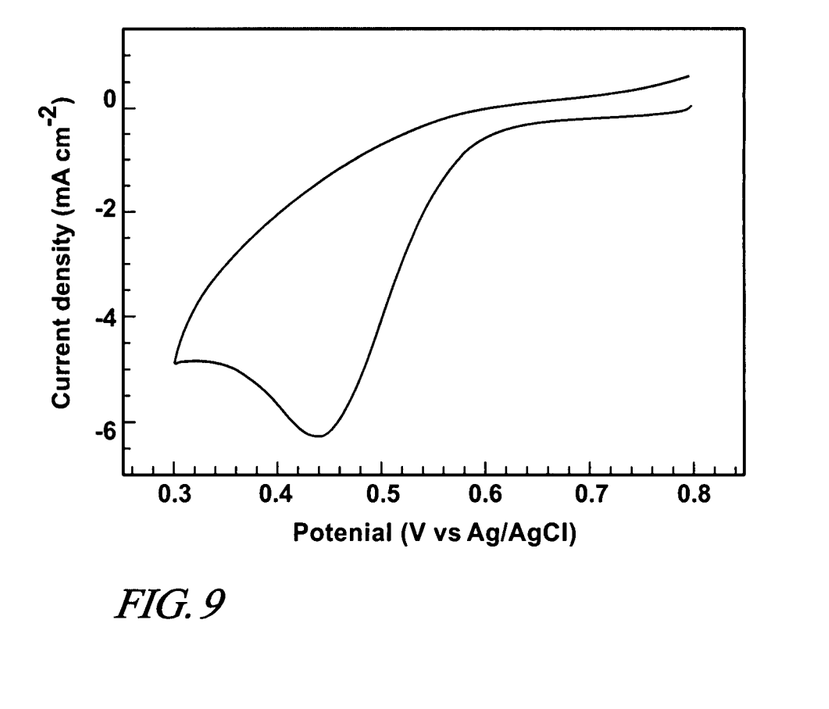
FIG. 9 presents cyclic voltammetry data for a platinum on-carbon-coated Sn nanowires prepared in accordance with this invention. The catalyst was prepared by a chemical method and tested in oxygen-saturated 0.5 M $H_2SO_4$ aqueous solution at room temperature. The data is presented as current density (mAcm$^{-2}$) versus potential (V vs. Ag/AgCl).

4. Pt Nanoparticles Supported on Carbon-Coated Sn Nanowire Catalysts Prepared by the Chemical Method:

In a similar way to that of Pt nanoparticles supported $SnO_2$ nanowire catalysts, electrocatalytic activity of oxygen reduction reaction for the Pt nanoparticles supported on carbon-coated Sn nanowires catalysts prepared by the chemical method. After deposition of the Pt nanoparticles, a very large oxygen reduction wave, at potentials characteristic for Pt electrocatalysis in this solution, was observed (FIG. 9).

Example 4

Figure 10:
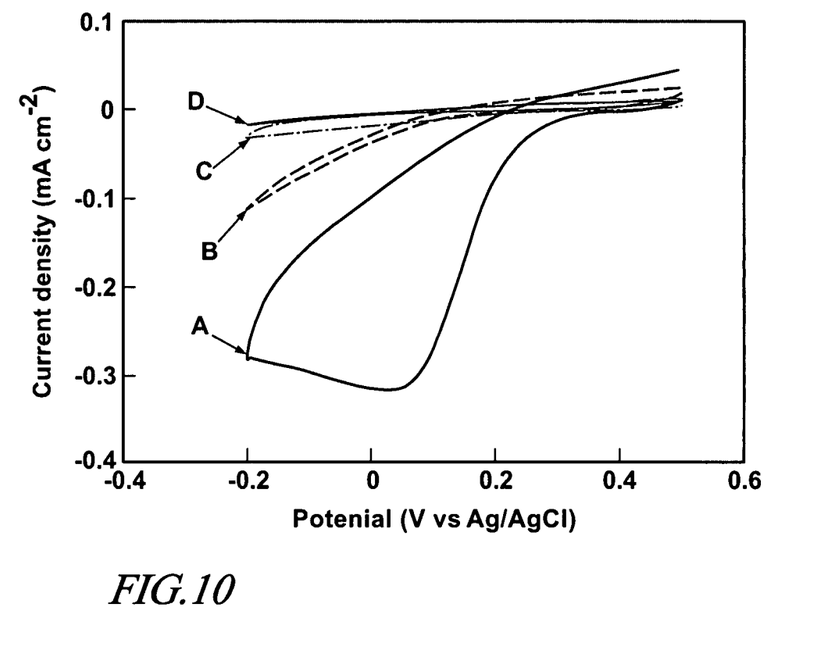

Electrocatalytic Activity of Oxygen Reduction Reaction in Neutral Phosphate Buffer Solution Pt Nanoparticles Supported $SnO_2$ Nanowire Catalysts Prepared by Electrochemical Method:

The mechanisms of oxygen reduction are dependent on the pH value of the medium used in the application. To investigate the oxygen reduction reaction for the Pt nanoparticles supported on $SnO_2$ nanowire catalysts, cyclic voltammograms has also been performed in neutral phosphate buffer as shown in FIG. 10. The phosphate buffer solution contained 8 g/L NaCl, 0.2 g/L KCl, 1.44 g/L $Na_2HPO_4$, and 0.24 g/L $KH_2PO_4$ with a pH of 7.4. Traces A and B show after and before deposition of the Pt nanoparticles. Traces C and D are the blank response of $SnO_2$ nanowires before and after Pt nanoparticles, respectively, in deoxygenated phosphate buffer solution. In the absence of the Pt nanoparticles, no oxygen reduction is observed over this potential window (0.2 to 0.7 V, curve B). After deposition of the nanoparticles, a very large oxygen reduction wave, at potentials characteristic for Pt electrocatalysis in the solution was observed. In FIG. 10, the current onset potential of $O_2$ reduction shifts from 50 to 350 mV for the Pt nanoparticles supported $SnO_2$ nanowire catalysts (trace A), indicating a higher electrocatalytic activity for $O_2$ reduction.

Example 5

Stability of $SnO_2$ Nanowires Grown on Carbon Fibers of a Carbon Paper

Figure 11A:
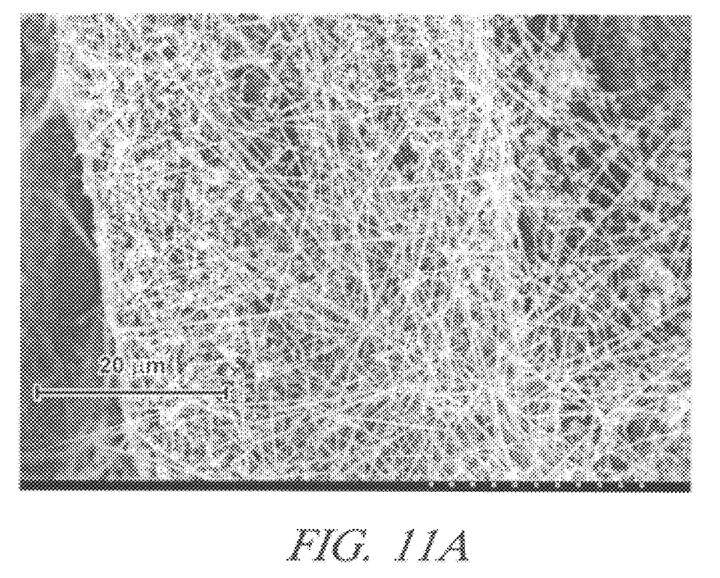
FIG. 11A is a SEM image of $SnO_2$ nanowires grown on carbon fibers of a carbon paper after overnight immersion in 70% $HNO_3$.
Figure 11B:
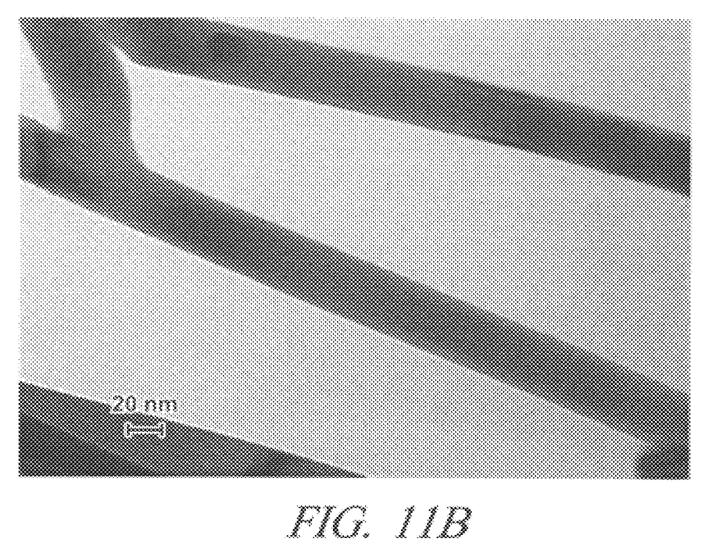
FIG. 11B is a TEM image of $SnO_2$ nanowires grown on carbon fibers of a carbon paper after overnight immersion in 70% $HNO_3$.

One of the major concerns for the application of nanowires in PEM fuel cells is to ensure the strong adhesion of these nanowires to the carbon paper so that it will remain on the surface of carbon paper during fuel cell operation. To test this, the SnO$_2$ nanowires-carbon paper composite electrode was immersed in 70% nitric acid over-night. After over-night immersion, there were no discernible white particles in the solution, demonstrating a strong adhesion between SnO$_2$ nanowires and carbon paper. Further investigation of the stability of the SnO$_2$ nanowires/carbon paper composite was also carried out by immersing the composite electrode in 0.1 M H$_2$SO$_4$ solution over a period of 1500 h at 50° C. After the stability test, SEM and TEM observations (See FIGS. 11A and 11B.) revealed that the high-density SnO$_2$ nanowires were still on the surface of the carbon fibers and the diameters of the nanowires had not changed, suggesting strong adhesion between the nanowires and the carbon paper as well as high stability for the SnO$_2$ nanowires.

The practice of the invention has been illustrated with specific examples related to SnO$_2$ and carbon-coated Sn nanowires. The examples are not intended to limit the scope of the invention. For example, other nanowire materials such as WOx and TiO$_2$ nanowires with and without carbon coating may be used as good supports for catalyst particles.

The invention claimed is:

1. A method of making a supported catalyst for a fuel cell, the method comprising:
   forming tin oxide (SnO$_2$) nanowires directly on carbon fibers by oxidative thermal evaporation of tin metal powder in an oxygen-containing inert gas atmosphere to form tin oxide nanowires and depositing the tin oxide nanowires from the oxygen-containing inert gas atmosphere on carbon fibers, said tin oxide nanowires comprising a substantially circular cross-sectional shape, said circular cross-sectional shape having a diameter; and then
   depositing nanoparticles of a catalytic metal on the tin oxide nanowires formed on the carbon fibers.

2. A method of making a supported catalyst for a fuel cell as recited in claim 1 in which an oxygen-containing inert gas stream is flowed over the tin metal powder.

3. A method of making a supported catalyst for a fuel cell as recited in claim 1 in which an oxygen-containing argon stream is flowed over the tin metal powder.

4. A method of making a supported catalyst as recited in claim 1 in the which deposited catalytic metal comprises a metal of the platinum group of metals, and the catalytic metal is deposited as nanoparticles, either chemically or by cyclic voltammetry, on the tin oxide nanowires formed on the carbon fibers.

5. A method of making a supported catalyst as recited in claim 1 in which surfaces of the deposited tin oxide nanowires are oxidized before depositing of the catalytic metal.

6. A method of making a supported catalyst as recited in claim 1 in which the surfaces of the deposited tin oxide nanowires are oxidized with nitric acid, and then platinum particles are deposited chemically or by cyclic voltammetry on the tin oxide nanowires.

7. A method of making a supported catalyst as recited in claim 1 in which the deposited catalytic metal comprises as metal of the platinum group of metals.

8. A method of making a supported catalyst as recited in claim 1 in which the tin oxide nanowires are formed in an oxygen-containing argon atmosphere, the surfaces of the nanowires are oxidized, and then platinum nanoparticles are deposited chemically or by cyclic voltammetry on the tin oxide nanowires.

9. A method of making a supported catalyst as recited in claim 1 in which tin oxide nanowires are formed in an oxygen-containing argon atmosphere, the surfaces of the nanowires are oxidized with nitric acid, and then platinum nanoparticles are deposited chemically or by cyclic voltammetry on the tin oxide nanowires.

* * * * *